(12) United States Patent
Lee

(10) Patent No.: US 6,580,702 B1
(45) Date of Patent: Jun. 17, 2003

(54) DATA TRANSMISSION APPARATUS FOR CDMA COMMUNICATION SYSTEM AND METHOD THEREOF

(75) Inventor: Kyung Kuk Lee, Seoul (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/223,753

(22) Filed: Dec. 31, 1998

(30) Foreign Application Priority Data

Nov. 26, 1998 (KR) ............................................. 98/51018

(51) Int. Cl.[7] ............................................. H04B 7/216
(52) U.S. Cl. ...................... 370/335; 370/342; 370/350; 370/441
(58) Field of Search ................................ 370/335, 342, 370/441, 479, 522, 350, 208, 206, 209, 284, 347, 535, 538, 320, 329; 375/143, 148, 132

(56) References Cited

U.S. PATENT DOCUMENTS

| | | |
|---|---|---|
| 3,993,867 A | 11/1976 | Blood, Jr. |
| 4,768,191 A | 8/1988 | Polcer |
| 5,099,493 A | 3/1992 | Zeger et al. |
| 5,103,459 A | 4/1992 | Gilhousen et al. |
| 5,193,102 A | 3/1993 | Meidan et al. |
| 5,289,499 A | 2/1994 | Weerackody |
| 5,329,547 A | 7/1994 | Ling |
| 5,619,526 A * | 4/1997 | Kim et al. .................. 370/335 |
| 5,784,419 A * | 7/1998 | LaRosa et al. ............... 378/350 |
| 6,060,950 A * | 5/2000 | Groe ........................... 330/279 |
| 6,061,359 A * | 5/2000 | Schilling et al. ............. 370/441 |
| 6,160,803 A * | 12/2000 | Yuen et al. .................. 370/342 |
| 6,236,863 B1 * | 5/2001 | Waldroup et al. ........... 455/522 |

FOREIGN PATENT DOCUMENTS

| | | |
|---|---|---|
| CN | 1117333 A | 2/1996 |
| CN | 1186400 A | 7/1998 |
| WO | WO 95/16319 | 10/1994 |

OTHER PUBLICATIONS

Office Action from the People's Republic of China, dated May 10, 2002.
English–language translation of the China Office Action.
English–language translation of Korean Patent Application No. 1019960058204, which is the priority application of CN1186400A.

* cited by examiner

Primary Examiner—Dang Ton
Assistant Examiner—Phuc Tran
(74) Attorney, Agent, or Firm—Fleshner & Kim, LLP

(57) ABSTRACT

A data transmission apparatus for a CDMA communication system and a method are disclosed. The apparatus includes a digital combiner for combining a plurality of digital signals spread by a plurality of CDMA spreader, a digital filter for filtering a signal inputted from the digital combiner, a D/A converter for converting the filtered digital signal into an analog signal, and an analog filter for filtering the converted analog signal, for thereby performing a combining in a digital region before a plurality of CDMA signals are converted into an analog form.

4 Claims, 2 Drawing Sheets

DATA TRANSMISSION APPARATUS FOR CDMA COMMUNICATION SYSTEM AND METHOD THEREOF

BACKGROUND OF THE INVENTION

1. Field of the Invention

The present invention relates to a communication system, and in particular to a data transmission apparatus for a CDMA communication system and a method thereof.

2. Description of the Conventional Art

Generally, in the cellular communication system, in order to decrease the effects of any interference, a spectrum spreading technique capable of more widely spreading a carrier spectrum compared to an information ratio is used. As a CDMA spectrum spreading technique, there are known a direct spreading method (DS: direct sequence) and a frequency hopping (FH) method.

The DS-CDMA method is directed to spreading an information signal into a designated spectrum region by modulating the information signal using an ideally random spreading code. Actually, as the above-described spreading code, the sequence of the psuedorandom numbers which is a signal stream repeating at a long period is used.

In addition, a receiver reversely spreads the spread signal using a reverse spreading code which is the same as the spreading code.

The above-described operation will be explained with reference to the following equations.

The spreading operation at the side of a transmission may be expressed as follows.

$$y(t)=a(t) \cdot c(t) \ldots \quad (1)$$

where the voice signal which is first modulated to a PCM signal is a (t), the PN code is c (t), and the wave form transmitted is y(t).

Assuming that the signal at the side of the transmission is not decreased, and there is not any interference or noise, the wave form at the side of the receiving is y(t), and the reverse spreading output z(t) may be expressed as follows because the code same as the spreading code c(t) is multiplied.

$$z(t)=y(t) \cdot c(t)=a(t) \cdot \{c(t)\}^2 \ldots \quad (2)$$

Here, since c(t) is the sequence of the random numbers which is defined as +1 or −1, therefore, when squaring c(t), a result of the computation is 1. Therefore, z(t) may be expressed as follows.

$$z(t)=a(t) \ldots \quad (3)$$

Therefore, it is possible to recover the original data a(t) based on the reverse spreading process. Here, at the side of the receiving, it is needed to generate the wave form which is the same as the side of the transmission at the same time. The PN code is preferably a random number. If the PN code is the random number, since it is impossible to represent the condition that the sequences of the random numbers at the sides of the transmission and receiving are absolutely identical, the sequence of the psuedorandom numbers is used.

Generally, the service based on the DS-CDMA communication apparatus is provided through a transmission and receiving base station which provides a communication service to a plurality of subscribers. Since the base station provides concurrently a communication service to a large number of communication apparatuses in a predetermined region. Therefore, the base station is needed to be capable of concurrently transmitting and receiving the CDMA signals.

In order to effectively implement the above-described operation, a plurality of CDMA transceiver and antenna may be provided to one base station. This method results in much cost. Therefore, for more economical method, a transceiver which is capable of transmitting and receiving a plurality of signals through one antenna is used for thereby transmitting and receiving the signals.

In order to perform a transmitting and receiving operation of a plurality of CDMA signals through a common antenna, the outputs from each CDMA channel are combined before the power is amplified. The power amplification with respect to a plurality of signals transmitted through the common antenna is performed by a linear amplifier.

FIG. 1 illustrates a transmission apparatus in the side of a base station for transmitting an information signal based on a conventional CDMA mobile communication system.

As shown therein, the transmission apparatus includes a plurality of CDMA spreaders 10-1 through 10-n for spreading a plurality of PCM data inputted through the side of a transmission terminal using a PN code inputted from the PN code generator (not shown) through a plurality of channels, a plurality of digital filters 20-1 through 20-n for filtering the CDMA signals modulated by the CDMA spreaders, a plurality of D/A converters 30-1 through 30-n for converting the digital signals outputted from the digital filters into analog signals, a plurality of analog filters 40-1 through 40-n for filtering the analog signals outputted from the D/A converters, a plurality of gain controllers 50-1 through 50-n for uniformly controlling the gains of the outputs from the analog filters, an analog combiner 60 for combining the signals inputted from the gain controllers, an IF processor 70 for converting the base band signal inputted from the analog combiner 60 into an intermediate frequency signal in accordance with a clock signal generated by a local oscillator (not shown), and a RF processor 80 for amplifying the IF signal, converting the same into a high (radio) frequency signal and transmitting the converted signal through an antenna.

Here, the digital filter 20, the D/A converter 30, the analog filter 40, the gain controller 50, and the combiner form a circuit block for processing the base band signals. Namely, this block is called as a base band signal processor 90.

The operation of the conventional CDMA base station transmission apparatus will be explained.

The voice signal inputted through a telephone line is first converted into a PCM signal through a base control station, and the thusly converted data is inputted into a corresponding CDMA spreader 10-k through one channel CH.K selected among the channels CH.1 through CH.n allocated to each base station, and the CDMA spreader 10-k modulates the data signal in accordance with a PN code outputted from the PN code generator (not shown).

The CDMA-converted digital signal is filtered by a corresponding digital filter 20-k and is converted into an analog signal by the D/A converter 30-k. In addition, the analog signal outputted from the digital/analog converter 30-k is applied to the analog filter 40-k and is filtered by the same, and then the resultant signal is applied to the gain controller 50-k for thereby uniformly controlling the gain of the same.

The above-described operations are performed in the same manner as the channels. The signals outputted from the gain controllers 50-1 through 50-n are applied to the analog combiner (60), respectively, and are combined by the analog combiner 60 and then are applied to the IF processor 70.

The IF processor 70 converts the base band signal inputted from the analog combiner 60 into an intermediate frequency signal in accordance with a clock signal generated by the local oscillator, and the thusly converted IF signal is converted into a high (radio) frequency signal by the RF processor 80 and is transmitted to a free air space through one antenna.

In the conventional art in which the signals spread by the channel are combined and then transmitted through one antenna, the digital filter 20, the D/A converter 30, and the analog filter 40 are additionally needed for each channel.

Therefore, when the analog signals processed for each channel are combined, the timing of each signal should be adjusted. In this operation, a timing error of few ns may occurs in the signals due to the different characteristic of the devices, a different fabrication environment, and the different length of the wire. Therefore, it is impossible to synchronize accurately the above-described timing of the signals.

In addition, since the digital filters, the D/A converters, and the analog filters are used, the construction of the hardware is complicated, and the fabrication cost is increased.

SUMMARY OF THE INVENTION

Accordingly, it is an object of the present invention to provide a data transmission apparatus for a CDMA communication system and a method thereof which are capable of performing a combining in a digital region before a plurality of CDMA signals are converted into an analog form.

To achieve the above objects, there is provided a CDMA communication system which includes a digital combiner for combining a plurality of digital signals spread by a plurality of CDMA spreader, a digital filter for filtering a signal inputted from the digital combiner, a D/A converter for converting the filtered digital signal into an analog signal, and an analog filter for filtering the converted analog signal.

To achieve the above objects, there is provided a CDMA communication method which includes the steps of spreading a plurality of PCM data inputted from the side of a transmission terminal through a plurality of channels using a predetermined code, combining the spread digital CDMA signals and performing a base band signal process for an analog signal process, converting the base band signal into an intermediate frequency signal, and converting the intermediate frequency signal into a high (radio) frequency signal and then outputting the converted signal through an antenna.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
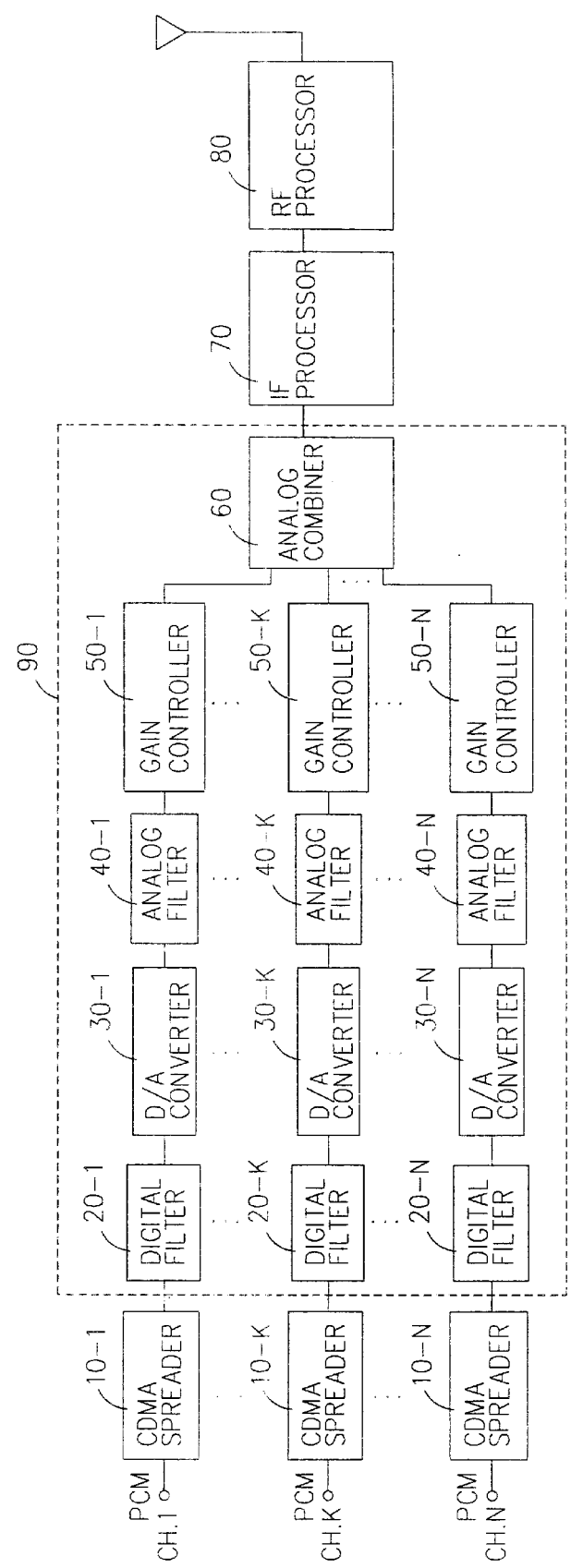
FIG. 1 is a block diagram illustrating a base station side transmission apparatus for a conventional CDMA communication system.
Figure 2:
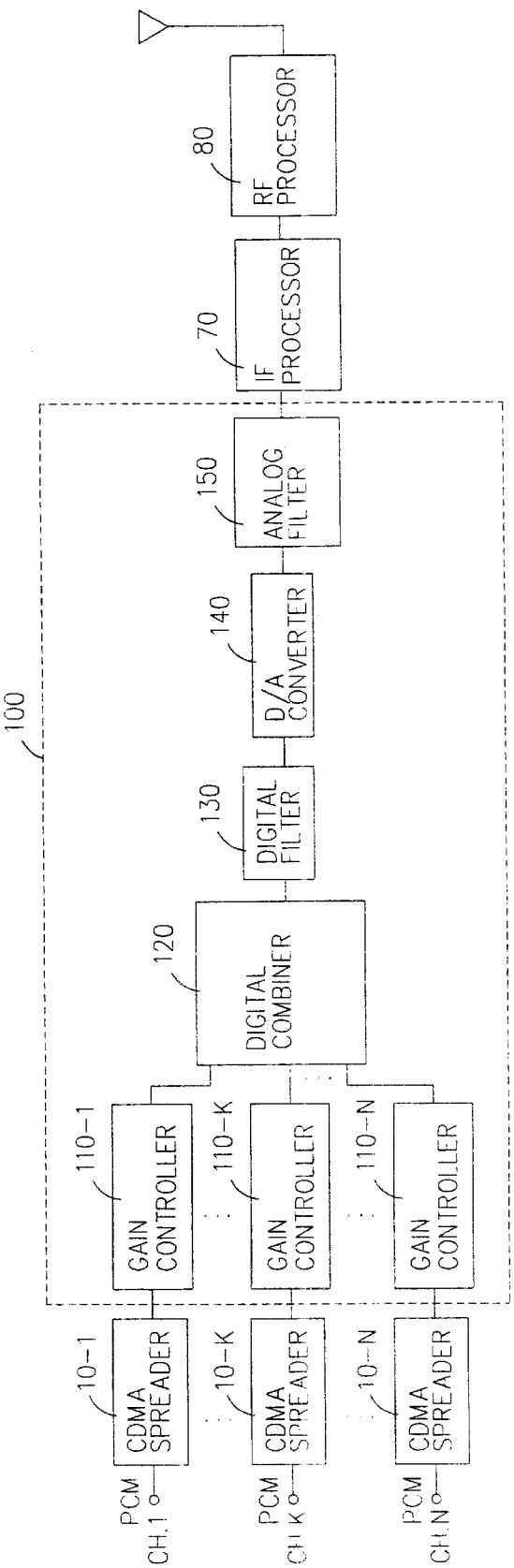
FIG. 2 is a block diagram illustrating a base station side transmission apparatus for a CDMA communication system according to the present invention.

FIG. 2 is a bock diagram illustrating a base station side transmission apparatus for a CDMA communication system according to the present invention.

As shown therein, the base station side transmission apparatus for a CDMA communication system according to the present invention includes a base band signal processor 100 which includes a plurality of gain controllers 110-1 through 110-n for controlling uniformly the gains of the CDMA signals spread by the CDMA spreaders 10-1 through 10-n, a digital combiner 120 for combining the gain-controlled CDMA digital signals, a digital filter 130 for filtering the signal inputted from the digital combiner 120, and a D/A converter 140 for converting the filtered digital signal into an analog signal. The remaining constructions of the base station side transmission apparatus according to the present invention is the same as the conventional art. Therefore, the description thereof will be omitted.

The data transmission process at the side of the base station for a CDMA communication system according to the present invention will be explained with reference to the accompanying drawings.

An information signal inputted through a telephone line is first converted into a PCM signal by a base control station. The PCM signal is inputted into a corresponding CDMA spreader 10-k through one channel CH.K selected among a plurality of channels CH.1 through CH.n allocated to each base station, and the CDMA spreader 10-k spreads the information in accordance with a PN code generated by a PN code generator (not shown).

The CDMA-modulated digital signal is applied to a corresponding gain controller 110-k, and the gain of the signal is controlled thereby.

The above-described operation is performed with respect to each of the channels. The digital signals outputted from the gain controllers 110-1 through 110-n are applied to the digital combiner 120. The digital combiner 120 combines the digital signals in accordance with a clock signal generated by the clock generator (not shown) in synchronization with the digital CDMA signals.

The thusly combined signal is filtered by the digital filter 130 and is converted into an analog signal by the D/A converter 140. In addition, the analog signal outputted from the D/A converter 140 is filtered by the analog filter 150 and is applied to the IF processor 70.

The IF processor 70 converts the base band signal into an intermediate frequency signal, and the thusly converted IF signal is converted into the high (radio) frequency signal having its power amplified to a predetermined level by the RF processor 80 and is transmitted to a free air space through one antenna.

As described above, in the present invention, the CDMA-converted signals are combined in the digital region using the digital combiner 120 before the signals are converted into the analog signals, and then the signals are processed for the band base signals based on one digital filter 130, the D/A converter 140, and the analog filter 150. Therefore, it is possible to decrease the errors which occur due to the different characteristics of each element, a different fabrication environment, and a different wire length which are the problems of the conventional art.

In addition, in the present invention, since the timing synchronization is performed with respect to the digital signal, so that it is possible to prevent a timing error for each channel for thereby enhancing a reliability of the system.

Furthermore, in the present invention, one digital filter, one D/A converter, and one analog filter are used, the fabrication cost of the system is decreased.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. In a CDMA communication system, a data transmission apparatus comprising:

a plurality of CDMA spreaders for spreading a plurality of PCM data inputted from a side of a transmission terminal through a plurality of channels using a predetermined code;

a base band signal processor for combining the digital CDMA signals spread by the CDMA spreaders and then processing analog signals;

an IF processor for converting the base band signals inputted from the base band signal processor into an intermediate frequency signal; and an RF processor for converting the IF signals into a power-amplified high (radio) frequency signal and outputting the thusly converted signal through an antenna, wherein the base band signal processor comprises,
a digital combiner for combining the CDMA digital signals spread by the CDMA spreaders,
a digital filter for filtering a signal inputted from the digital combiner,
a D/A converter for converting the filtered digital signal into an analog signal, and
an analog filter for filtering the converted analog signal,
wherein the digital combiner combines a plurality of CDMA signals in synchronization with a predetermined clock signal.

2. The system of claim 1, wherein one digital filter, D/A converter, and analog filter are used for each base station, respectively.

3. In a CDMA communication system, a data transmission method comprising:

spreading a plurality of PCM data inputted from the side of a transmission terminal through a plurality of channels using a predetermined code;

combining the spread digital CDMA signals and performing a base band signal process for an analog signal process;

converting the base band signal into an intermediate frequency signal; and converting the intermediate frequency signal into a high (radio) frequency signal and then outputting the converted signal through an antenna, wherein the base band signal process comprises,
combining a plurality of spread CDMA digital signals,
filtering the combined digital signal,
converting the filtered digital signals into analog signals, and
filtering the converted analog signals,
wherein in the digital combining step, the digital CDMA signals are combined in synchronization with a predetermined clock signal.

4. The method of claim 3, further comprising a step for uniformly controlling the gains of the CDMA signals before the digital combining step.

* * * * *